US011313330B2

(12) United States Patent
Suzuki et al.

(10) Patent No.: US 11,313,330 B2
(45) Date of Patent: Apr. 26, 2022

(54) GAS-LIQUID SEPARATOR

(71) Applicant: USUI CO., LTD., Shizuoka (JP)

(72) Inventors: Tetsunobu Suzuki, Shizuoka (JP); Hidetaka Ito, Shizuoka (JP)

(73) Assignee: USUI CO., LTD., Shizuoka (JP)

( * ) Notice: Subject to any disclaimer, the term of this patent is extended or adjusted under 35 U.S.C. 154(b) by 0 days.

(21) Appl. No.: 16/759,183

(22) PCT Filed: Oct. 17, 2018

(86) PCT No.: PCT/JP2018/038732
§ 371 (c)(1),
(2) Date: Apr. 24, 2020

(87) PCT Pub. No.: WO2019/082772
PCT Pub. Date: May 2, 2019

(65) Prior Publication Data
US 2020/0277919 A1    Sep. 3, 2020

(30) Foreign Application Priority Data

Oct. 25, 2017 (JP) .............................. JP2017-206576

(51) Int. Cl.
*B01D 45/12*     (2006.01)
*F02M 26/35*     (2016.01)
(Continued)

(52) U.S. Cl.
CPC ............ *F02M 26/35* (2016.02); *F02M 26/05* (2016.02); *F02M 26/06* (2016.02); *F02M 26/19* (2016.02); *F02M 35/10* (2013.01)

(58) Field of Classification Search
CPC ........ F02M 26/35; F02M 26/05; F02M 26/06; F02M 26/19; F02M 35/10;
(Continued)

(56) References Cited

U.S. PATENT DOCUMENTS 1,735,298 A * 11/1929 Pfeffer ..................... B04C 3/04
  55/343
1,959,907 A *  5/1934 Ebert ..................... F02M 23/03
  261/41.2
(Continued)

FOREIGN PATENT DOCUMENTS

CN       108697958      10/2018
EP       1 684 888       2/2011
(Continued)

OTHER PUBLICATIONS

International Search Report dated Dec. 18, 2018 in International (PCT) Application No. PCT/JP2018/038732.

*Primary Examiner* — Dung H Bui
(74) *Attorney, Agent, or Firm* — Wenderoth, Lind & Ponack, L.L.P.

(57) ABSTRACT

A gas-liquid separator includes an inlet pipe and an inner pipe. The inlet pipe includes a swirling flow generating member therewithin, and a first drain port through which the liquid exits. The inner pipe includes an opening at an end which is inserted into an end of the inlet pipe. The swirling flow generating member includes a vane supporting portion extending along an axis line of the inlet pipe, and stator vanes provided on an outer circumferential surface of the vane supporting portion. The vane supporting portion has a conical shape whose diameter gradually increases from a fluid entering side to a fluid exiting side of the gas-liquid two-phase fluid. The stator vanes surround the outer circumference with inclining relative to the axis line of the inlet pipe.

9 Claims, 9 Drawing Sheets

(51) Int. Cl.
*F02M 26/05* (2016.01)
*F02M 26/06* (2016.01)
*F02M 26/19* (2016.01)
*F02M 35/10* (2006.01)

(58) Field of Classification Search
CPC ............ F02M 35/10262; F02M 26/50; F02M 35/0223; F02M 26/22; F02B 29/0468; F02B 37/00; B01D 45/16; B01D 45/12; B01D 45/08; Y02T 10/12; Y02T 10/146; B04C 3/02; B04C 3/06; B04C 2003/003; B04C 2003/006
See application file for complete search history.

(56) References Cited

U.S. PATENT DOCUMENTS

| | | | | |
|---|---|---|---|---|
| 2,245,536 A * | 6/1941 | Thurman | C11D 13/20 | 554/156 |
| 2,538,195 A * | 1/1951 | Henkel | B01D 45/08 | 55/450 |
| 3,433,361 A * | 3/1969 | Ades | B01D 21/26 | 210/258 |
| 3,517,821 A * | 6/1970 | Keller | B04C 5/06 | 210/512.1 |
| 3,526,082 A * | 9/1970 | Thuillier | B01D 45/16 | 96/302 |
| 3,713,279 A * | 1/1973 | Moore | B01D 45/16 | 55/319 |
| 3,813,854 A * | 6/1974 | Hortman | B04C 3/00 | 55/399 |
| 3,884,658 A * | 5/1975 | Roach | B01D 45/12 | 55/315 |
| 3,885,934 A | 5/1975 | Eads et al. | | |
| 3,885,935 A | 5/1975 | Nutter | | |
| 4,008,059 A * | 2/1977 | Monson | B01D 45/14 | 55/396 |
| 4,162,906 A * | 7/1979 | Sullivan | B04C 3/04 | 55/346 |
| 4,180,391 A * | 12/1979 | Perry, Jr | B01D 45/16 | 55/324 |
| 4,187,089 A * | 2/1980 | Hodgson | B01D 45/18 | 96/412 |
| 4,289,611 A * | 9/1981 | Brockmann | B04C 3/04 | 209/710 |
| 4,311,494 A * | 1/1982 | Conner | B01D 45/16 | 55/394 |
| 4,588,423 A * | 5/1986 | Gillingham | B03C 3/12 | 96/43 |
| 4,971,603 A * | 11/1990 | Prinsloo | B04C 3/00 | 95/269 |
| 4,976,748 A * | 12/1990 | Prinsloo | B04C 3/00 | 95/269 |
| 5,294,410 A * | 3/1994 | White | B01D 53/70 | 422/171 |
| 5,320,654 A * | 6/1994 | Minami | B01D 45/04 | 55/347 |
| 5,403,367 A * | 4/1995 | De Villiers | B01D 50/002 | 55/320 |
| 6,540,802 B2 * | 4/2003 | Trautmann | F02M 35/10059 | 55/337 |
| 6,540,917 B1 * | 4/2003 | Rachels | B04C 3/00 | 210/512.1 |
| 6,752,845 B2 * | 6/2004 | Haland | B01D 45/16 | 55/340 |
| 6,958,107 B1 * | 10/2005 | Clarke | B04C 3/06 | 159/2.1 |
| 6,962,199 B1 * | 11/2005 | Tjeenk Willink | B01D 45/16 | 166/265 |
| 7,743,742 B2 * | 6/2010 | Wagner | B01D 45/16 | 123/41.86 |
| 7,835,483 B2 * | 11/2010 | Chaki | B04C 3/00 | 376/370 |
| 8,043,394 B2 * | 10/2011 | Mital | F01N 13/009 | 55/337 |
| 8,425,641 B2 * | 4/2013 | Chaudhari | B04C 3/06 | 55/319 |
| 8,764,886 B2 * | 7/2014 | Halpap | B04C 5/181 | 95/271 |
| 2002/0189995 A1 * | 12/2002 | Bruckmann | B04C 3/06 | 210/512.1 |
| 2002/0194988 A1 * | 12/2002 | Betting | B01D 45/16 | 95/29 |
| 2005/0028499 A1 * | 2/2005 | Greif | B04C 3/04 | 55/456 |
| 2005/0252837 A1 * | 11/2005 | Haland | B01D 19/0063 | 210/97 |
| 2008/0251419 A1 * | 10/2008 | Stein | B01D 45/16 | 208/106 |
| 2008/0271421 A1 * | 11/2008 | Darke | B01D 45/16 | 55/396 |
| 2010/0147021 A1 * | 6/2010 | Betting | B01D 45/16 | 62/533 |
| 2010/0205949 A1 | 8/2010 | Bolda et al. | | |
| 2011/0048696 A1 * | 3/2011 | Holte | E21B 43/124 | 166/105.5 |
| 2014/0116255 A1 * | 5/2014 | Perez | B01D 45/12 | 96/216 |
| 2014/0130467 A1 * | 5/2014 | Herman | B01D 46/125 | 55/414 |
| 2014/0299540 A1 * | 10/2014 | Ackermann | B04C 3/06 | 210/512.3 |
| 2015/0290560 A1 * | 10/2015 | Hoydal | B01D 19/0063 | 95/22 |
| 2015/0306528 A1 * | 10/2015 | Mueller | B04C 3/06 | 55/338 |
| 2016/0096129 A1 * | 4/2016 | Kochubei | F01M 11/08 | 95/269 |
| 2016/0177893 A1 * | 6/2016 | Finn | F02M 35/024 | 95/23 |
| 2017/0152860 A1 * | 6/2017 | Miclea-Bleiziffer | F02B 37/225 | |
| 2017/0333918 A1 * | 11/2017 | Hua | B04C 11/00 | |
| 2018/0250620 A1 * | 9/2018 | Vingelven | B01D 45/16 | |
| 2018/0369731 A1 * | 12/2018 | Mueller | B04C 3/06 | |
| 2019/0168147 A1 * | 6/2019 | Bratton | B01D 45/12 | |

FOREIGN PATENT DOCUMENTS

| | | |
|---|---|---|
| EP | 3 391 952 | 10/2018 |
| ES | 2 363 857 | 8/2011 |
| JP | 58-191371 | 12/1983 |
| JP | 63-192951 | 8/1988 |
| JP | 1-83459 | 6/1989 |
| JP | 11-83151 | 3/1999 |
| JP | 2007-512943 | 5/2007 |
| JP | 2010-104906 | 5/2010 |
| JP | WO2017/104531 | 6/2017 |
| WO | 2005/049176 | 6/2005 |
| WO | 2017/104184 | 6/2017 |

* cited by examiner

GAS-LIQUID SEPARATOR

CROSS-REFERENCE TO RELATED APPLICATION

This application is based upon and claims the benefit of priority from Japanese Patent Application No. 2017-206576 filed on Oct. 25, 2017, the entire disclosure of which is incorporated herein by reference.

TECHNICAL FIELD

The present disclosure relates to a gas-liquid separator that separates a gas-liquid two-phase fluid into a gas and a liquid.

BACKGROUND ART

Conventionally, a gas-liquid separator including a swirling flow generating member that swirls fluid flowing through pipes is known in the art (see Patent Literature 1: JPH01-83459U, for example). Such a swirling flow generating member includes a cylindrical vane supporting portion and a plurality of stator vanes that spirally surround an outer circumferential surface of the vane supporting portion. Also, a swirling flow generating member including a vane supporting portion with a bullet shape and a plurality of stator vanes that spirally surround an outer circumferential surface of the vane supporting portion is known in the art (see Patent Literature 2: JPH11-83151A, for example).

SUMMARY

In the conventional swirling flow generating member, the shape of the vane supporting portion in which the stator vanes are provided is cylindrical or bullet shape. Accordingly, the outer circumferential surface of the vane supporting portion extends substantially parallel to an inner circumferential surface of the pipe at least in a fluid exiting side end. This may strict the fluid flowing along the outer circumferential surface of the vane supporting portion from flowing toward the inner circumferential surface of the pipe. Consequently, the centrifugal force may not sufficiently be applied to the fluid.

The present disclosure is made considering the above issue, and an object of the present disclosure is to provide a gas-liquid separator that improves the centrifugal force applied to the gas-liquid two-phase fluid flowing through pipes to improve liquid separation performance.

To achieve the above object, the present disclosure provides a gas-liquid separator for separating a liquid and a gas from a gas-liquid two-phase fluid. The gas-liquid separator includes a swirling flow generating member configured to swirl the gas-liquid two-phase fluid, an inlet pipe in which the swirling flow generating member is disposed, and an inner pipe. The inlet pipe includes an inner circumferential surface to which the separated liquid is guided, and a drain port through which the liquid exits the inlet pipe. The drain port is located in a fluid exiting side of the gas-liquid two-phase fluid from the swirling flow generating member. The inner pipe includes an end inserted into an end of the inlet pipe and an opening formed in the end of the inner pipe. The swirling flow generating member extends along an axis line of the inlet pipe. The swirling flow generating member includes a vane supporting portion having a conical shape and a stator vane provided on an outer circumferential surface of the vane supporting portion. The diameter of the vane supporting portion gradually increases from a fluid entering side to the fluid exiting side of the gas-liquid two-phase fluid. The stator vane surrounds the outer circumferential surface with inclined relative to the axis line of the inlet pipe.

DETAILED DESCRIPTION

Hereinafter, an embodiment of a gas-liquid separator according to the present disclosure will be described in accordance with a first embodiment illustrated in the accompanying drawings.

First Embodiment

The configuration of a gas-liquid separator according to the first embodiment will be separately described under headings "Overall Configuration of System", "Configuration of Gas-Liquid Separator", "Configuration of Swirling flow generating member", and "Configuration of Pipe Cooling Structure".

Figure 1:
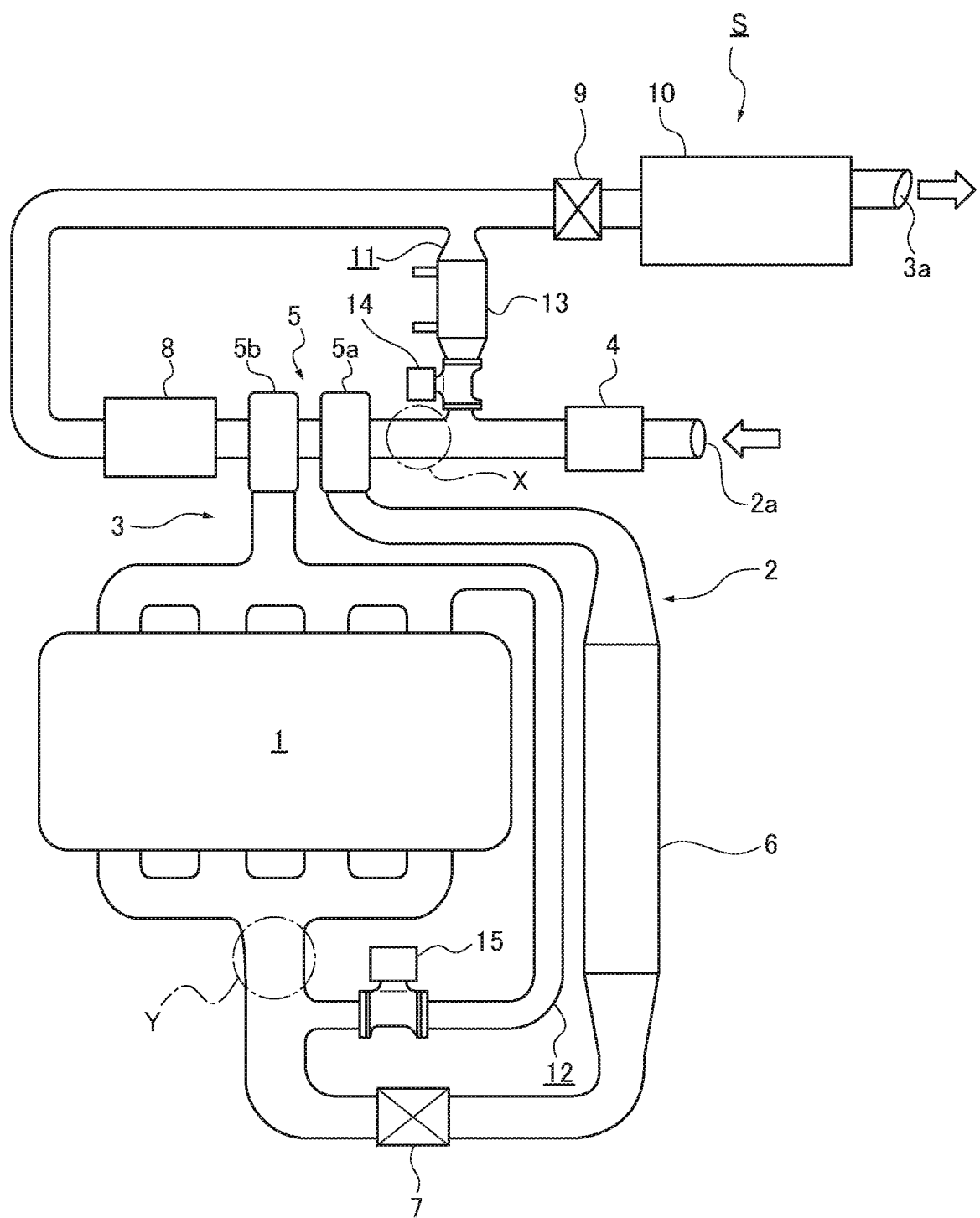
FIG. 1 is a view entirely illustrating an exhaust gas recirculation system of an internal combustion engine to which a gas-liquid separator according to a first embodiment is applied.

(Overall Configuration of System) FIG. 1 is a view entirely illustrating an exhaust gas recirculation system of an internal combustion engine to which a gas-liquid separator according to the first embodiment is applied. Hereinafter, an overall configuration of the system according to the first embodiment will be described with reference to FIG. 1.

The gas-liquid separator 20 according to the first embodiment is applied to an exhaust gas recirculation system S of an internal combustion engine 1 shown in FIG. 1. The internal combustion engine 1 shown in FIG. 1 is a diesel engine mounted in a vehicle as a driving source for traveling and includes four cylinders (not shown). The cylinders are connected to an intake passage 2 and an exhaust passage 3.

The intake passage 2 includes an intake port 2a at an end. In order from the intake port 2a to the internal combustion engine 1, the intake passage 2 is provided with an air cleaner 4 for filtering an intake air, a compressor 5a of a turbocharger 5, an intercooler 6 for cooling the intake air, and a throttle valve 7 for regulating an amount of the intake air. In order from the internal combustion engine 1, the exhaust passage 3 is provided with a turbine 5b of the turbocharger 5, an exhaust purification catalyst 8 for purifying exhaust gas, and an exhaust throttle valve 9 for regulating an amount of the exhaust gas. A muffler 10 is disposed downstream of the exhaust throttle valve 9, and an exhaust port 3a is disposed downstream of the muffler 10.

The intake passage 2 is connected to the exhaust passage 3 via a low-pressure EGR passage 11 and a high-pressure EGR passage 12. Here, "EGR (Exhaust Gas Recirculation)" is a technology for recirculating a portion of the exhaust gas after combustion in the internal combustion engine 1 back to the intake passage. "EGR" is also referred to as exhaust gas recirculation.

The low-pressure EGR passage 11 connects a portion of the intake passage 2 located upstream of the compressor 5a and a portion of the exhaust passage 3 located downstream of the exhaust purification catalyst 8. On the other hand, the high-pressure EGR passage 12 connects a portion of the intake passage 2 located downstream of the compressor 5a and a portion of the exhaust passage 3 located upstream of the turbine 5b. Thereby, the low-pressure EGR passage 11 returns the exhaust gas passing through the turbine 5b to the intake air before the compressor 5a. In addition, the high-pressure EGR passage 12 returns the exhaust gas before flowing into the turbine 5b to the intake air passing through the compressor 5a.

The low-pressure EGR passage 11 includes an EGR cooler 13 for cooling the exhaust gas returning to the intake passage 2 and a low-pressure EGR valve 14 for regulating an amount of the exhaust gas returning to the intake passage 2 via the low-pressure EGR passage 11. The high-pressure EGR passage 12 includes a high-pressure EGR valve 15 for regulating an amount of the exhaust gas returning to the intake passage 2 via the high-pressure EGR passage 12.

The low-pressure EGR passage 11 can return the exhaust gas without reducing the amount of the exhaust gas passing through the turbocharger 5 and can effectively reduce NOx. However, the cooling in the EGR cooler 13 brings an issue of concern to generate condensed water. Therefore, in the first embodiment, the gas-liquid separator 20 (see FIG. 2) is provided downstream of the low-pressure EGR valve 14 and upstream of the compressor 5a of the turbocharger 5 (i.e. at a location surrounded by a dashed line X in FIG. 1) to collect and drain the condensed water.

Figure 2:
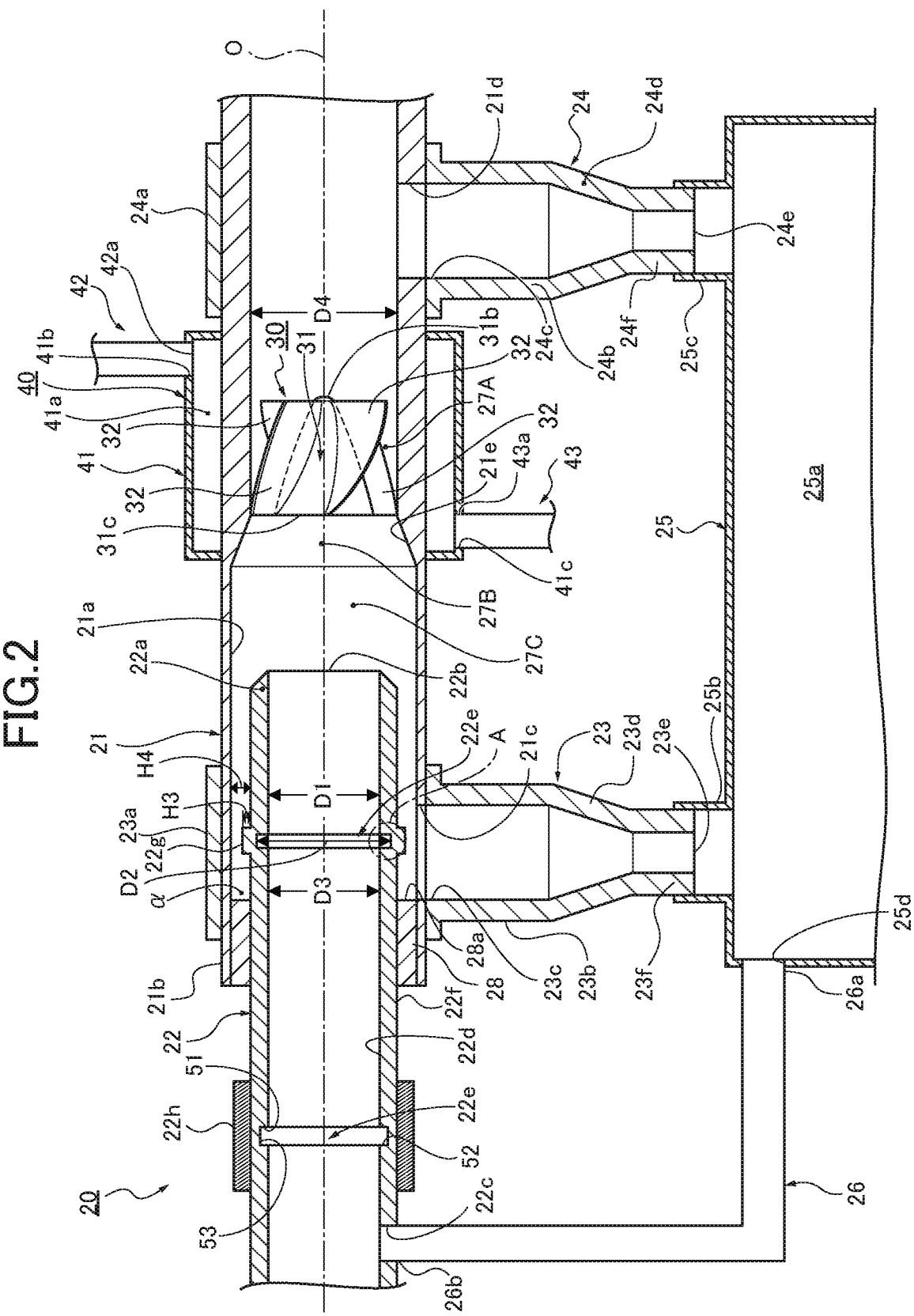
FIG. 2 is a cross-sectional view illustrating the gas-liquid separator according to the first embodiment.

(Configuration of Gas-Liquid Separator) FIG. 2 is cross-sectional views illustrating the gas-liquid separator according to the first embodiment. Hereinafter, the configuration of the gas-liquid separator according to the first embodiment will be described in detail with reference to FIG. 2.

As shown in FIG. 2, the gas-liquid separator 20 according to the first embodiment includes an inlet pipe 21, an inner pipe 22, a first drain pipe 23, a second drain pipe 24, a reservoir tank 25, a bypass pipe 26, a swirling flow generating member 30, and a pipe cooling structure 40.

The inlet pipe 21 includes an end which is located upstream in a flow direction of the gas-liquid two-phase fluid (on the right side in FIG. 2; hereinafter referred to as "fluid entering side"). The upstream end of inlet pipe 21 is in connection with the intake port 2a and the low-pressure EGR valve 14. The inlet pipe 21 receives an exhaust gas in the mixture of a gas and a particulate liquid (condensed water) (hereinafter, referred to as "the gas-liquid two-phase fluid"). The swirling flow generating member 30 is disposed within the inlet pipe 21. The swirling flow generating member 30 is configured to swirl the gas-liquid two-phase fluid along an inner circumferential surface 21a of the inlet pipe 21. The inlet pipe 21 includes a first drain port 21c (a drain port) and a second drain port 21d (an upstream drain port). The first drain port 21c is formed in at an end portion 21b downstream in the flow direction of the gas-liquid two-phase fluid (on the left side in FIG. 2; hereinafter referred to as "the fluid exiting side") from the swirling flow generating member 30. The second drain port 21d is formed in the fluid entering side of the swirling flow generating member 30.

The first drain port 21c is an opening through which the liquid separated from the gas-liquid two-phase fluid exits. The first drain port 21c opens in the radial direction of the inlet pipe 21 and downward in the direction of gravity. The second drain port 21d is an opening through which the liquid contained in the gas-liquid two-phase fluid before swirling exits. The second drain port 21d also opens in the radial direction of the inlet pipe 21 and downward in the direction of gravity. It should be noted that "the direction of gravity" is a direction the gravity acts and the downward direction in FIG. 2.

Further, the inner circumferential surface 21a of the inlet pipe 21 includes a tapered surface 21e. The tapered surface 21e is located in the fluid exiting side of the swirling flow generating member 30. The tapered surface 21e is configured to gradually increase the inner diameter of the inlet pipe 21 toward the fluid exiting side. The inlet pipe 21 includes a first area 27A located in the fluid entering side of the tapered surface 21e, a second area 27B in which the tapered surface 21e is formed, and a third area 27C located in the fluid exiting side of the tapered surface 21e. Accordingly, the inner diameter of the inlet pipe 21 is the smallest in the first area 27A and the largest in the third area 27C, and gradually increases in the second area 27B. In addition, the fluid entering side end of the second area 27B is located close to the fluid exiting side end of the swirling flow generating member 30. In other words, the fluid exiting side end of the swirling flow generating member 30 is set to be positioned in the vicinity of the fluid entering side end of the second area 27B.

The first area 27A includes the second drain port 21d and the swirling flow generating member 30 while the third area 27C includes the first drain port 21c.

The inner pipe 22 is a straight pipe member which has an outer diameter smaller than the inner diameter of the inlet pipe 21 in the third area 27C. An end 22a of the inner pipe 22 is inserted into the end portion 21b at the fluid exiting side of the inlet pipe 21 so that the inner pipe 22 is disposed coaxially with the inlet pipe 21.

A gap or clearance α is formed between the inlet pipe 21 and the inner pipe 22, and a spacer 28 is disposed therewithin. The spacer 28 has a cylindrical shape to surround the entire circumference of the inner pipe 22. An outer circumferential surface of the spacer 28 contacts an inner circumferential surface 21a of the inlet pipe 21 in an airtight state. On the other hand, an inner circumferential surface of the spacer 28 contacts an outer circumferential surface 22f of the inner pipe 22 in an airtight state. The spacer 28 includes an axial end 28a within the inlet pipe 21. The axial position of the axial end 28a is coincident with that of a most-downstream portion of a circumferential edge of the first drain port 21c. Specifically, the spacer 28 is provided not to overlap the opening area of the first drain port 21c and not to leave any gap or clearance in the axial direction between the spacer 28 and the opening area of the first drain port 21c.

The inner pipe 22 includes an opening 22b in the end 22a inserted into the inlet pipe 21. The opening 22b is located in the fluid exiting side of the swirling flow generating member 30 and opens in the axial direction of the inner pipe 22. The end of the inner pipe 22 in the fluid exiting side (i.e. the left side in FIG. 2) is in communication with the compressor 5a of the turbocharger 5. The inlet pipe 21, the inner pipe 22 and the opening 22b are arranged coaxially relative to each other.

In addition, the inner pipe 22 includes a vent hole 22c at a portion extending from the inlet pipe 21. The vent hole 22c radially extends through the circumferential surface of the inner pipe 22. To the vent hole 22c, a second end 26b of the bypass pipe 26 is connected. The inner pipe 22 further includes a plurality of circular grooves 22e (two in this embodiment) formed on an inner circumferential surface 22d. Also, the inner pipe 22 includes a protrusion 22g on the outer circumferential surface 22f of a portion of the inner pipe 22 inserted into the inlet pipe 21. An electrical heating sheet 22h (heating structure) is provided along the outer circumferential surface 22f of the portion of the inner pipe 22 extending from the inlet pipe 21.

Figure 3:
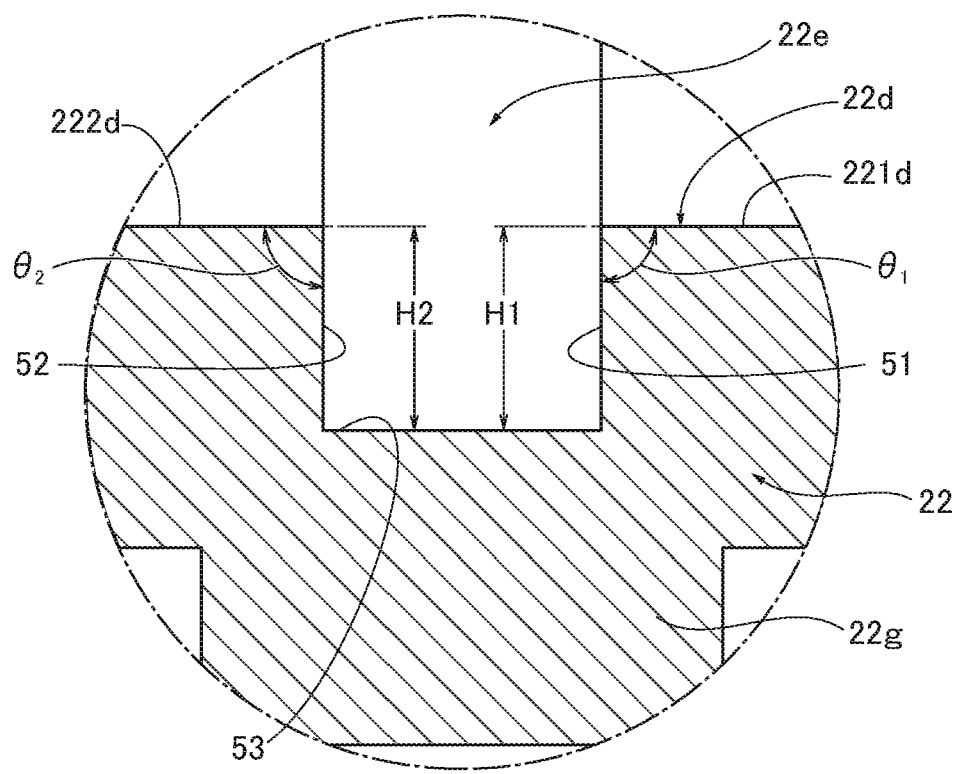
FIG. 3 is an enlarged view of a portion A shown in FIG. 2.

The circular grooves 22e formed in the inner pipe 22 are circular recesses circumferentially extending along the inner pipe 22. The circular grooves 22e are disposed axially inward of the inner pipe 22, i.e. at positions closer to the fluid exiting side than the swirling flow generating member 30. In this embodiment, one of the two circular grooves 22e is disposed on the inner circumferential surface of the portion of the inner pipe 22 inserted into the inlet pipe 21. This circular groove 22e is formed inside the protrusion 22g so that the axial position of this circular groove 22e is coincident with that of the protrusion 22g. The other of the circular grooves 22e is disposed on the inner circumferential surface of the portion of the inner pipe 22 extending from the inlet pipe 21. As shown in the enlarged view of FIG. 3, each of the circular grooves 22e includes a first step surface 51, a second step surface 52 and a bottom surface 53.

The first step surface 51 is one of the surfaces defining the circular groove 22e and located in the fluid entering side. The first step surface 51 increases the inner diameter of the inner pipe 22 in a step-wise manner toward the fluid exiting side. Specifically, an inner diameter dimension D2 of the inner pipe 22 defined within the circular groove 22e is larger than an inner diameter dimension D1 of the inner pipe 22 in the fluid entering side of the circular groove 22e. The first step surface 51 and an inner circumferential surface 221d of the inner pipe 22 which is located in the fluid entering side of the first step surface 51 define an angle $\theta_1$. In this embodiment, the angle $\theta_1$ is set to 90 degrees.

The second step surface 52 is another surface defining the circular groove 22e and located in the fluid exiting side. The second step surface 52 decreases the inner diameter of the inner pipe 22 in a step-wise manner toward the fluid exiting side. Specifically, the inner diameter dimension D2 of the inner pipe 22 defined within the circular groove 22e is larger than an inner diameter dimension D3 of the inner pipe 22 in the fluid exiting side of the circular groove 22e. The second step surface 52 and an inner circumferential surface 222d of the inner pipe 22 which is located in the fluid exiting side of the second step surface 52 define an angle $\theta_2$. In this embodiment, the angle $\theta_2$ is set to 90 degrees. In addition, a height H2 of the second step surface 52 has the same height as a height H1 of the first step surface 51.

The bottom surface 53 of the circular groove 22e is located between the first step surface 51 and the second step surface 52. The bottom surface 53 extends in the circumferential direction of the inner pipe 22.

The protrusion 22g radially and circumferentially extends from the outer circumferential surface 22f of the inner pipe 22 to entirely surround the outer circumferential surface 22f. The protrusion 22g is formed above the first drain port 21c of the inlet pipe 21 in the direction of gravity. The protrusion 22g has a height H3. The clearance between the inner circumferential surface 21a of the inlet pipe 21 and the outer circumferential surface 22f of the inner pipe 22 has a height H4. The height H3 of the protrusion 22g is set to be smaller than the height H4 of the clearance. Thereby, a gap or clearance is formed between a tip surface of the protrusion 22g and the inner circumferential surface 21a of the inlet pipe 21.

The electrical heating sheet 22h is a flexible sheet including heating wires which generate heat when a switch (not shown) is turned on. The electrical heating sheet 22h is wound around the outer circumferential surface 22f of the inner pipe 22. The inner pipe 22 is heated when the heating wires of the electrical heating sheet 22h generates heat. In this embodiment, the electrical heating sheet 22h surrounds the portion of the inner pipe 22 extending from the inlet pipe 21 where the other circular groove 22e is provided. Accordingly, the electrical heating sheet 22h heats the portion of the outer circumferential surface 22f where the other circular groove 22e (i.e. the first step surface 51) is provided.

The first drain pipe 23 is a T-shaped pipe including a first pipe member 23a and a second pipe member 23b. The second pipe member 23b is connected to an axial center portion of the first pipe member 23a and perpendicular to the first pipe member 23a. The end portion 21b of the inlet pipe 21 in the fluid exiting side extends into the first pipe member 23a and is fixed thereto. A connection opening 23c is formed at a connection portion between the first pipe member 23a and the second pipe member 23b to face the first drain port 21c. Thereby, the inlet pipe 21 is in communication with the second pipe member 23b of the first drain pipe 23 via the drain port 21c and the connection opening 23c.

The inner diameter of the first drain port 21c formed in the inlet pipe 21 has the substantially same size as that of the connection opening 23c of the first drain pipe 23. The second pipe member 23b extends downward in the direction of gravity with respect to the axial direction of the inlet pipe 21. The second pipe member 23b includes a tapered diameter portion 23d in the middle thereof. The diameter of the tapered diameter portion 23d becomes gradually smaller in the liquid flow direction. Accordingly, the inner diameter of a tip opening 23e is smaller than the inner diameters of the connection opening 23c and the first drain port 21c.

The second drain pipe 24 is a T-shaped pipe including a first pipe member 24a and a second pipe member 24b. The second pipe member 24b is connected to an axial center portion of the first pipe member 24a and perpendicular to the first pipe member 24a. The inlet pipe 21 extends through the first pipe member 24a. A connection opening 24c is formed at a connection portion between the first pipe member 24a and the second pipe member 24b to face the second drain port 21d. Thereby, the inlet pipe 21 is in communication with the second pipe member 24b of the second drain pipe 24 via the second drain port 21d and the connection opening 24c.

The inner diameter of the second drain port 21d formed in the inlet pipe 21 has the substantially same size as that of the connection opening 24c of the second drain pipe 24. The second pipe member 24b extends downward in the direction of gravity with respect to the axial direction of the inlet pipe 21. The second pipe member 24b includes a tapered diameter portion 24d in the middle thereof. The diameter of the tapered diameter portion 24d becomes gradually smaller in the liquid flow direction. Accordingly, the inner diameter of a tip opening 24e is smaller than the inner diameters of the connection opening 24c and the second drain port 21d.

The reservoir tank 25 includes a tank body 25a disposed below the first drain pipe 23 and the second drain pipe 24 in the direction of gravity. The tank body 25a includes a first connection opening 25b and a second connection opening 25c which are formed at an upper portion of the tank body 25a. The first connection opening 25b is connected to a tip portion 23f of the second pipe member 23b of the first drain pipe 23. The second connection opening 25c is connected to a tip portion 24f of the second pipe member 24b of the second drain pipe 24. The second pipe member 23b includes in the tip portion 23f the tip opening 23e which is in communication with the first connection opening 25b. The second pipe member 24b includes in the tip portion 24f the tip opening 24e which is in communication with the second connection opening 25c. The tank body 25a includes a vent hole 25d to which a first end 26a of the bypass pipe 26 is connected. The vent hole 25d is formed at an upper portion of a side wall of the tank body 25a in the direction of gravity. The tank body 25a includes a drain opening (not shown) formed at a lower portion thereof in the direction of gravity. The drain opening is configured to open and close. The liquid may be discharged from the tank body 25a via the drain opening when the liquid in the tank body 25a reaches a predetermined amount.

The bypass pipe 26 is a pipe member for connecting the inner pipe 22 and the reservoir tank 25. The bypass pipe 26 includes the first end 26a and the second end 26b which are opening ends. The first end 26a is connected to the vent hole 25d of the tank body 25a while the second end 26b is connected to the vent hole 22c of the inner pipe 22. Accordingly, the bypass pipe 26 communicates an inside of the tank body 25a with an inside of the inner pipe 22.

Figure 4A:
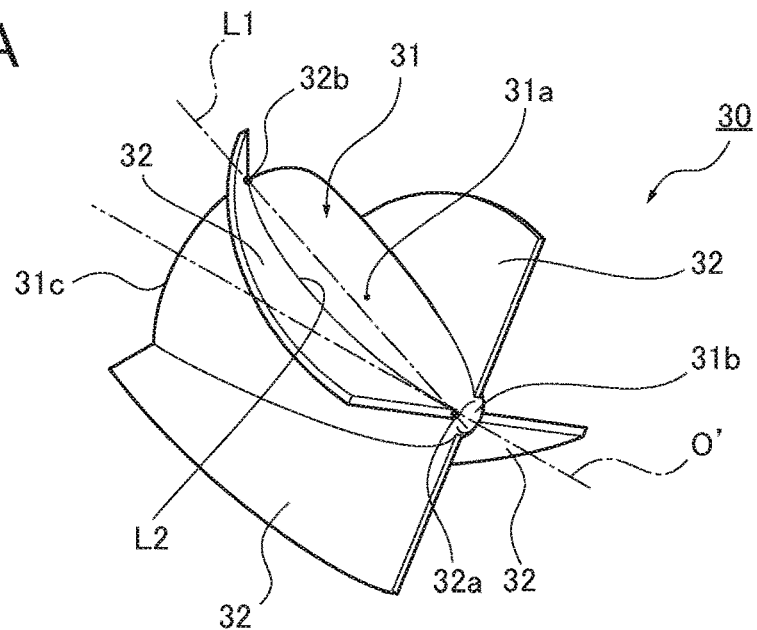
FIG. 4A is a perspective view illustrating a swirling flow generating member according to the first embodiment.
Figure 4B:
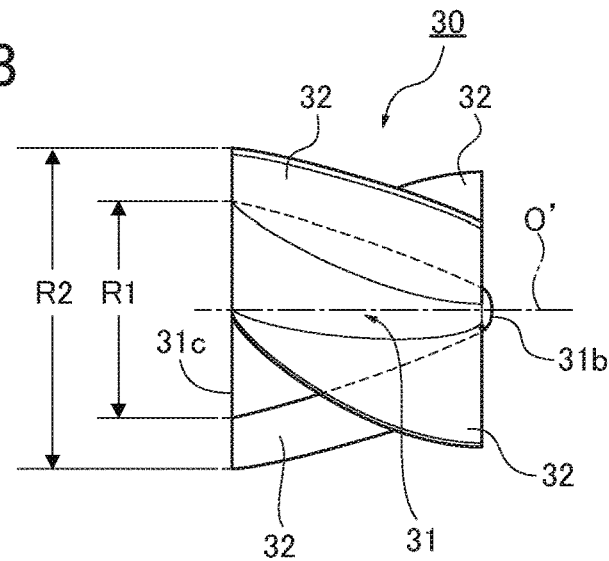
FIG. 4B is a side view illustrating the swirling flow generating member according to the first embodiment.
Figure 4C:
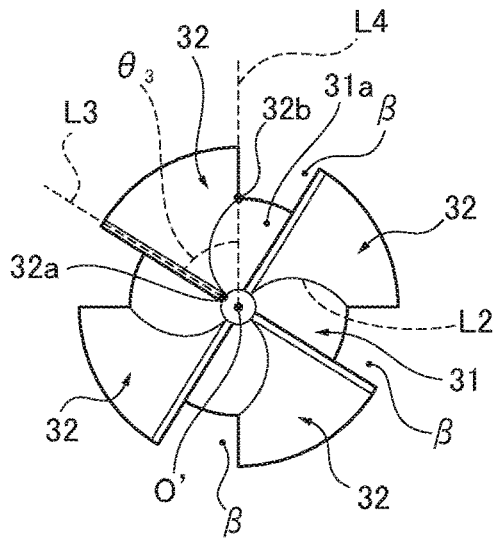
FIG. 4C is a front view illustrating the swirling flow generating member according to the first embodiment.

(Configuration of Swirling Flow Generating Member) FIGS. 4A to 4C are views illustrating the swirling flow generating member according to the first embodiment. Hereinafter, the configuration of the swirling flow generating member according to the first embodiment will be described in detail with reference to FIGS. 4A to 4C.

The swirling flow generating member 30 is disposed in the first area 27A of the inlet pipe 21 to regulate the flow direction of the gas-liquid two-phase fluid flowing through the inlet pipe 21 and generate the swirling flow. The swirling flow generating member 30 includes a vane supporting portion 31 and a plurality (four in this embodiment) of stator vanes 32. The stator vanes 32 are provided on an outer circumferential surface 31a of the vane supporting portion 31.

The vane supporting portion 31 extends along an axis line O of the inlet pipe 21. The vane supporting portion 31 has a conical shape whose outer diameter gradually increases from the fluid entering side to the fluid exiting side of the gas-liquid two-phase fluid. A maximum outer diameter dimension R1 of the vane supporting portion 31 is set to be smaller than an inner diameter dimension D4 of the inlet pipe 21 in the first area 27A. In the first embodiment, the vane supporting portion 31 includes a leading end 31b which has a round surface.

The stator vanes 32 spirally surround the outer circumferential surface 31a of the vane supporting portion 31. The extending direction of each stator vane 32 inclines relative to the axis line O of the inlet pipe 21. Specifically, a straight line L1 extending through an end position 32a in the side of the leading end 31b of the vane supporting portion 31 and an end position 32b in the side of a tailing end 31c of the vane supporting portion 31 in the stator vane 32 inclines relative to an axis line O' of the vane supporting portion 31. Further, in the stator vane 32, a contact line L2 between the vane supporting portion 31 and the stator vane 32 is spirally curved. It should be noted that the "leading end 31b" is an end in the fluid entering side of the vane supporting portion 31 and the "tailing end 31c" is an end in the fluid exiting side of the vane supporting portion 31.

The plurality (four) of stator vanes 32 are arranged at regular intervals in the circumferential direction of the vane supporting portion 31. The opposing surfaces of each stator vane 32 are parallel to each other.

Further, in the first embodiment, a surrounding angle $\theta_3$ of the stator vane 32 with respect to the vane supporting portion 31 is set approximately 60 degrees. The term the "surrounding angle" is an angle defined by a first straight line L3 radially extending from the axis line O' along the end position 32a and a second straight line L4 radially extending from the axis line O' along the end position 32b when the swirling flow generating member 30 is seen in the axial direction thereof as shown in FIG. 4C. Thereby, a clearance β is defined between the adjacent stator vanes 32 in the circumferential direction of the vane supporting portion 31 when the swirling flow generating member 30 is seen in the axial direction thereof.

A maximum outer diameter dimension R2 of the swirling flow generating member 30 is set to have the substantially same size as the inner diameter dimension D4 of the inlet pipe 21 in the first area 27A. Accordingly, the swirling flow generating member 30 is arranged coaxially with the inlet pipe 21 and the radial tips of the stator vanes 32 contact the inner circumferential surface 21a of the inlet pipe 21.

(Configuration of Pipe Cooling Structure) As shown in FIG. 2, the pipe cooling structure 40 is configured to surround the inlet pipe 21 to cool a portion of the inlet pipe 21 where the swirling flow generating member 30 is disposed. The pipe cooling structure 40 includes a cooling water circulation pipe 41, a first cooling water pipe 42, and a second cooling water pipe 43.

The cooling water circulation pipe 41 is a hollow cylindrical pipe having an inner diameter larger than the outer diameter of the inlet pipe 21. The inlet pipe 21 partially has a double pipe structure in which the inlet pipe 21 extends through the cooling water circulation pipe 41 to be surrounded by the cooling water circulation pipe 41. Thereby, a cooling water circulation space 41a is formed between the inlet pipe 21 and the cooling water circulation pipe 41. The cooling water circulation space 41a is a space surrounding the outer circumferential surface of the inlet pipe 21. The cooling water circulation pipe 41 surrounds a portion of the inlet pipe 21 between the first drain port 21c and the second drain port 21d. The surrounded portion of the inlet pipe 21 includes an area in which the swirling flow generating member 30 is disposed.

The first cooling water pipe 42 is a pipe through which cooling water (refrigerant) flows to the pipe cooling water circulation space 41a. One end 42a of the first cooling water pipe 42 is connected to a first opening 41b formed in the cooling water circulation pipe 41 while the other end (not shown) of the first cooling water pipe 42 is connected between an evaporator and an expansion valve of a refrigerating cycle of a vehicle air conditioner (not shown). The first opening 41b is an opening which radially opens to the cooling water circulation space 41a. Specifically, the first opening 41b is formed by making a circular hole on the circumferential surface of the cooling water circulation pipe 41. As shown in FIG. 2, the first opening 41b is formed in the fluid entering side of the swirling flow generating member 30 and above the swirling flow generating member 30 in the direction of gravity.

The second cooling water pipe 43 is a pipe through which the cooling water (refrigerant) discharged from the cooling water circulation space 41a flows. One end 43a of the second cooling water pipe 43 is connected to a second opening 41c formed in the cooling water circulation pipe 41 while the other end (not shown) of the second cooling water pipe 43 is connected between the compressor and the evaporator of the refrigerating cycle of the vehicle air conditioner (not shown). The second opening 41c is an opening which radially opens to the cooling water circulation space 41a. Specifically, the second opening 41c is formed by making a circular hole on the circumferential surface of the cooling water circulation pipe 41. As shown in FIG. 2, the second opening 41c is formed in the fluid exiting side of the swirling flow generating member 30 and below the swirling flow generating member 30 in the direction of gravity.

It should be noted that the locations of the first opening 41b and the second opening 41c are not limited to the ones shown in FIG. 2 but the first and second openings 41b, 41c may be formed in any locations. For example, the first opening 41b may be formed in the fluid exiting side of the swirling flow generating member 30 while the second opening 41c may be formed in the fluid entering side of the swirling flow generating member 30. In addition, the opening directions of the first and second openings 41b, 41c are not necessarily in the direction of gravity since the cooling water circulates under the water pressure.

Next, the operation of the gas-liquid separator 20 according to the first embodiment will be separately described under headings "Gas-Liquid Separation", "Liquid Collection", "Acceleration of Liquid Aggregation", "Acceleration of Liquid Evaporation", and "Maintain of Droplets by Second Step Surface".

Figure 5:
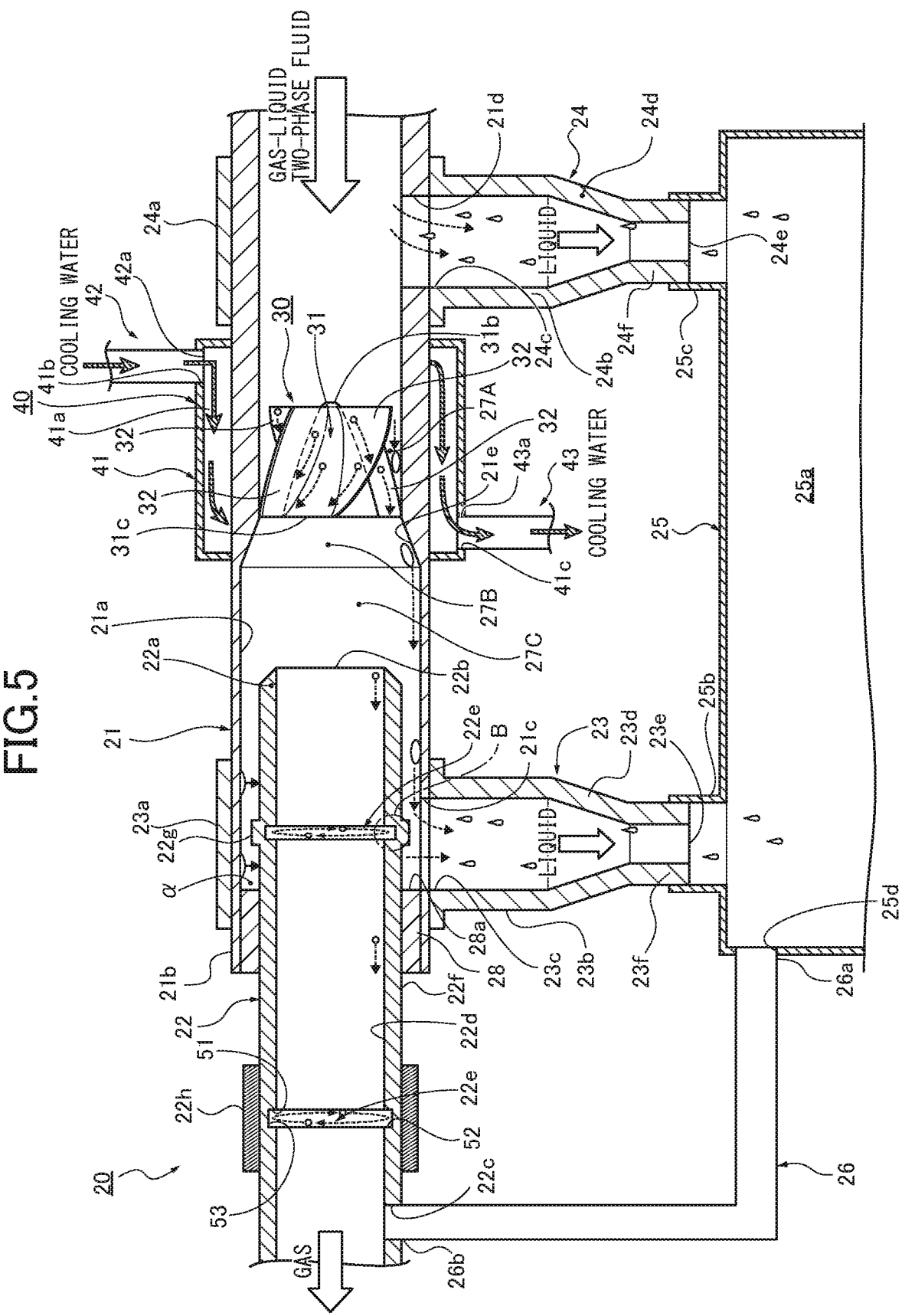
FIG. 5 is an overall explanatory view illustrating the flow of the gas-liquid two-phase fluid as well as the flows of the separated gas and liquid in the gas-liquid separator according to the first embodiment.

(Gas-Liquid Separation) FIG. 5 is explanatory views illustrating the flow of the gas-liquid two-phase fluid as well as the flows of the separated gas and liquid through the gas-liquid separator according to the first embodiment. Hereinafter, the gas-liquid separation in the first embodiment will be described with reference to FIG. 5.

In the exhaust gas recirculation system S shown in FIG. 1, an outside air taken from the intake port 2a and the exhaust gas taken from the exhaust passage 3 via the low-pressure EGR passage 11 flow into the compressor 5a of the turbocharger 5 at a flow rate of 1 m/s to 100 m/s. At this time, the outside air and the exhaust gas contain moisture. These gases are cooled in the EGR cooler 13 so that the moisture is condensed into the particulate liquid as condensed water, and the liquid is mixed with the gas such as air to form the gas-liquid two-phase fluid.

As shown in FIG. 5, in the gas-liquid separator 20 according to the first embodiment, the gas-liquid two-phase fluid flown into the inlet pipe 21 swirls when flowing through the first area 27A where the swirling flow generating member 30 is disposed and flowing along the swirling flow generating member 30. Thereby, the gas-liquid two-phase fluid becomes a swirling flow. The swirling flow generates the centrifugal force, which guides the liquid with the relatively large weight to flow toward the inner circumferential surface 21a of the inlet pipe 21.

The liquid guided toward the inner circumferential surface 21a of the inlet pipe 21 coheres to become droplets and is separated from the gas. The liquid separated from the gas flows from the second area 27B to the third area 27C by the swirling flow while attached to the inner circumferential surface 21a. The liquid flown to the third area 27C flows into the second pipe member 23b through the first drain port 21c in the third area 27C and the connection opening 23c of the first drain pipe 23 and falls down through the second pipe member 23b. Subsequently, the liquid flows out of the second pipe member 23b through the tip opening 23e and flows into the tank body 25a to be retained therein.

The first drain port 21c opens downward in the direction of gravity, and the second pipe member 23b of the first drain pipe 23 extends in the direction of gravity. Accordingly, the liquid flown to the third area 27C falls down toward the second pipe member 23b through the first drain port 21c by its own weight. In addition, the outer diameter of the inner pipe 22 is smaller than the inner diameter of the inlet pipe 21 in the third area 27C. Thereby, the liquid attached to the inner circumferential surface 21a of the inlet pipe 21 can be prevented from flowing into the inner pipe 22. Specifically, the liquid flown to the third area 27C flows into the clearance or space between the inlet pipe 21 and the inner pipe 22 so that the liquid is prevented from flowing into the inner pipe 22. Moreover, the inner pipe 22 is inserted into the inlet pipe 21 so that it is unnecessary to enlarge the diameter of the pipes and accordingly an installation space required for the gas-liquid separator 20 can be reduced.

In the first embodiment, the inner pipe 22 is in communication with the reservoir tank 25 via the bypass pipe 26. Accordingly, the flow of the gas through the inner pipe 22 generates a negative pressure in the reservoir tank 25 so that the liquid can smoothly flow through the first drain pipe 23.

In addition, the gas flowing through the inlet pipe 21 flows into the inner pipe 22 from the opening 22b which axially opens. At this time, the farther the liquid flows downstream in the flow direction of the gas-liquid two-phase fluid, the more the liquid is separated from the gas. Subsequently, the gas flows to the compressor 5a of the turbocharger 5 via the inner pipe 22. The spacer 28 is disposed in the end portion 21b of the inlet pipe 21 in the fluid exiting side to fill the clearance α between the inlet pipe 21 and the inner pipe 22. The spacer 28 prevents the gas from leaking through the clearance between the inlet pipe 21 and the inner pipe 22. Consequently, the gas separated from the gas-liquid two-phase fluid can smoothly flow into the inner pipe 22.

In the first embodiment, the swirling flow generating ember 30 includes the vane supporting portion 31 provided coaxially with the inlet pipe 21. The vane supporting portion 31 extends along the axis line O of the inlet pipe 21 and has a conical shape whose diameter gradually increases from the fluid entering side to the fluid exiting side of the gas-liquid two-phase fluid.

Accordingly, the gas-liquid two-phase fluid flowing around the axis center of the inlet pipe 21 flows along the outer circumferential surface 31a of the vane supporting portion 31 to be forced to flow toward the inner circumferential surface 21a of the inlet pipe 21. Consequently, the gas-liquid two-phase fluid is suppressed from flowing around the axis center of the inlet pipe 21. Further, even if the flow rate of the gas-liquid two-phase fluid flowing through the inlet pipe 21 is relatively row, the liquid contained in the gas-liquid two-phase fluid coheres, which facilitates the formation of droplets.

In addition, the stator vanes 32 of the swirling flow generating member 30 surround the outer circumferential surface 31a with inclined relative to the axis line O of the inlet pipe 21 to set a preterminal angle with respect to the flow direction of the gas-liquid two-phase fluid. Thereby, the flow direction of the gas-liquid two-phase fluid leans relative to the axis line O of the inlet pipe 21 so that the swirling flow can be generated. In addition, the liquid contained in the gas-liquid two-phase fluid collides with the stator vanes 32 and coheres so that the formation of droplets can be facilitated.

Further, the swirling flow generating member 30 is configured to have the stator vanes 32 on the outer circumferential surface 31a of the conical vane supporting portion 31. Accordingly, the axial dimension of the swirling flow generating member 30 can be reduced compared to a swirling flow generating ribbon which is formed by spirally twisting a plate member, for example. Thereby, the length of the first area 27A where the swirling flow generating member 30 is disposed can be reduced and accordingly the gas-liquid separator 20 can be downsized.

In addition, the flow resistance and the swirling amount of the gas-liquid two-phase fluid may be set as desired by adjusting the shape of the outer circumferential surface 31a of the vane supporting portion 31, the number of the stator vanes 32, the surrounding angle $\theta_3$ of each stator vane 32 relative to the vane supporting portion 31, or the like. Specifically, in the case where the surrounding angle $\theta_3$ is relatively large, a collision area of each stator vane 32 for the gas-liquid two-phase fluid increases and the flow path of the gas-liquid two-phase fluid is more curved. Thereby, the swirling amount of the gas-liquid two-phase fluid can be increased. On the other hand, in the case where the surrounding angle $\theta_3$ is relatively small, the straight line L1 extending along the end positions 32a, 32b of each stator vane 32 becomes closer to parallel to the axis line O. Thereby, the flow resistance is suppressed so that the gas-liquid two-phase fluid can smoothly flow. Further, the flow resistance and the swirling amount of the gas-liquid two-phase fluid may vary in accordance with the shape of the outer circumferential surface 31a of the vane supporting portion 31 (e.g. flat or curved). Accordingly, the flow resistance and the swirling amount of the gas-liquid two-phase fluid flowing through the inlet pipe 21 can be easily and properly controlled by adjusting the shape of the swirling flow generating member 30.

Moreover, in the first embodiment, the plurality of stator vanes 32 are arranged at regular intervals in the circumferential direction of the vane supporting portion 31. Accordingly, the flow resistance and the swirling amount of the gas-liquid two-phase fluid flowing through the inlet pipe 21 can also be easily and properly controlled.

Also, in the first embodiment, the inlet pipe 21 includes the second area 27B where the tapered surface 21e is provided on the inner circumferential surface 21a. The inner diameter of the tapered surface 21e gradually increases in the flow direction of the gas-liquid two-phase fluid. In addition, the fluid entering side end of the second area 27B is located in the vicinity of the fluid exiting side end of the swirling flow generating member 30. Accordingly, the liquid flown to the tailing end 31c of the vane supporting portion 31 of the swirling flow generating member 30 immediately flows to the tapered surface 21e. Consequently, the liquid guided along the outer circumferential surface 31a of the vane supporting portion 31 and the stator vanes 32 toward the inner circumferential surface 21a can smoothly flow to the first drain port 21c, further facilitating the guide and the separation of the liquid.

(Liquid Collection Operation) In the gas-liquid separator 20 according to the first embodiment, the inlet pipe 21 includes, in addition to the first drain port 21c, the second drain port 21d formed in the fluid entering side of the swirling flow generating member 30.

Therefore, even if the contained amount of the liquid in the gas-liquid two-phase fluid is relatively large and the liquid is not separated from the gas by swirling the gas-liquid two-phase fluid, the liquid which has already been the droplet with a certain size enough to fall down in the direction of gravity by its own weight can be discharged from the inlet pipe 21 through the second drain port 21d by its own weight before flowing along the swirling flow generating member 30. Then, the droplet falls down through the second drain pipe 24 connected to the second drain port 21d into the reservoir tank 25 to be retained therein.

In other words, in the gas-liquid separator 20 according to the first embodiment, the liquid contained in the gas-liquid two-phase fluid which can fall down in the direction of gravity by its own weight without swirling the gas-liquid two-phase fluid can be collected in advance before swirling the gas-liquid two-phase fluid. Consequently, the liquid separation rate can be improved by reducing the contained amount of the liquid when swirling the gas-liquid two-phase fluid.

In addition, the liquid to become the droplets while flowing along the inner circumferential surface 21a of the inlet pipe 21 by the swirling flow flows to the third area 27C and then falls down through the first drain pipe 23 from the first drain port 21c by its own weight. Then, the liquid flows through the first drain pipe 23 into the reservoir tank 25 to be retained therein. However, smaller droplets which cannot fall down by their own weight may stay within the inlet pipe 21 with attaching to the outer circumferential surface 22f of the inner pipe 22.

On the other hand, a portion of the gas contained in the gas-liquid two-phase fluid does not flow into the inner pipe 22 but flows into the clearance or space between the inlet pipe 21 and the inner pipe 22. However, the gas flown between the inlet pipe 21 and the inner pipe 22 is blocked by the spacer 28. Accordingly, the swirling flow of the gas along the inner circumferential surface 21a of the inlet pipe 21 collides with the spacer 28 and then flows backward along the outer circumferential surface 22f of the inner pipe 22 toward the opening 22b of the inner pipe 22.

Thereby, a portion of the droplets which cannot fall down by its own weight and is attached to the outer circumferential surface 22f of the inner pipe 22 may flow toward the opening 22b of the inner pipe 22 with the gas flowing toward the opening 22b.

In the gas-liquid separator 20 according to the first embodiment, on the other hand, the circumferentially extending protrusion 22g is provided on the portion of the outer circumferential surface 22f of the inner pipe 22 inserted into the inlet pipe 21 at a location facing the first drain port 21c.

Figure 6:
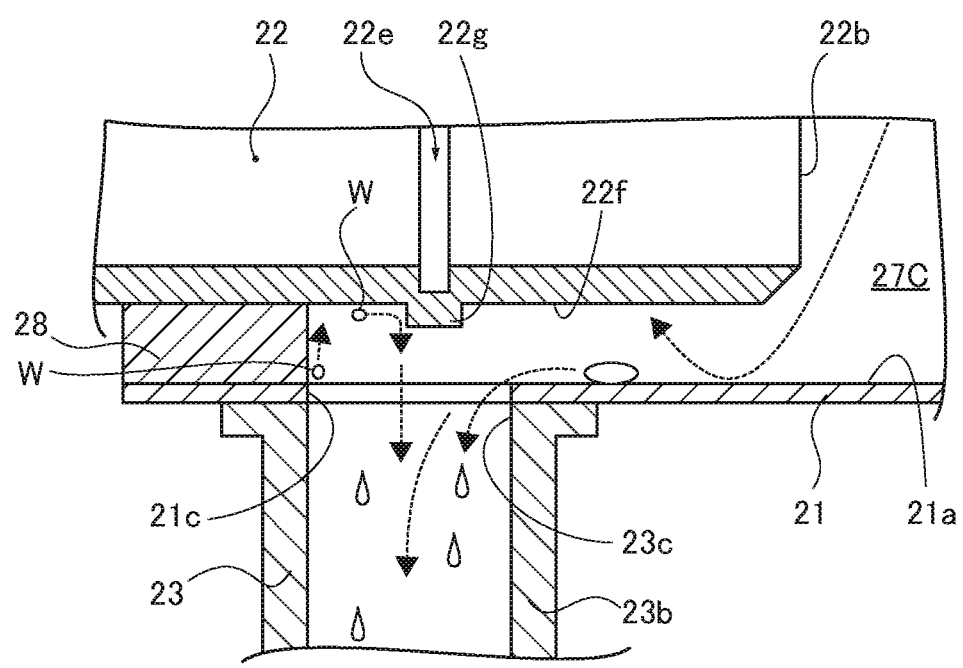
FIG. 6 is an enlarged view illustrating the flow of the liquid in the gas-liquid separator according to the first embodiment.

The gas which collides with the spacer 28 flows toward the opening 22b along the outer circumferential surface 22f of the inner pipe 22 to move the droplets W toward the opening 22b along the outer circumferential surface 22f. The protrusion 22g blocks the flow of the droplets W toward the opening 22b as shown in FIG. 6. Then, the droplets W blocked by the protrusion 22g are gathered and the gathered droplet falls down by its own weight into the first drain pipe 23 through the first drain port 21c when the weight of the gathered droplet becomes heavy enough to fall down.

Thereby, it is possible to prevent a portion of the droplets (liquid) from flowing into the inner pipe 22 and to appropriately collect the droplets even if the portion of the droplets attached to the outer circumferential surface 22f of the inner pipe 22 flows toward the opening 22b of the inner pipe 22 with the gas. Therefore, it is possible to prevent the liquid in the form of the droplets from being mixed with the gas flowing through the inner pipe 22.

(Acceleration of Liquid Aggregation) The flow of the gas-liquid two-phase fluid flowing through the inlet pipe 21 turns to the swirling flow when flowing along the swirling flow generating member 30 at a certain flow rate. However, the low flow rate of the gas-liquid two-phase fluid lowers the flow rate of the swirling flow, which weakens centrifugal force to be generated. This makes it difficult to guide the liquid to the inner circumferential surface 21a of the inlet pipe 21 so that the aggregation of the liquid is deteriorated and the liquid may not be separated sufficiently from the gas as desired.

On the other hand, in the gas-liquid separator 20 according to the first embodiment includes the pipe cooling structure 40. The inlet pipe 21 extends through the cooling water circulation pipe 41, and the cooling water circulation space 41a is formed between the inlet pipe 21 and the cooling water circulation pipe 41. The first cooling water pipe 42 and the second cooling water pipe 43 are connected to the cooling water circulation space 41a. Also, the first cooling water pipe 42 and the second cooling water pipe 43 are connected to the refrigerating cycle of the vehicle air conditioner (not shown).

Accordingly, when the cooling water circulates in the refrigerating cycle, a portion of the cooling water discharged from the expansion valve in the form of mist with low temperature and low pressure flows into the cooling water circulation space 41a through the first cooling water pipe 42. The cooling water entered the cooling water circulation space 41a flows axial direction of the inlet pipe 21 and then flows out through the second opening 41c to return to the refrigerating cycle via the second cooling water pipe 43.

The cooling water in the form of mist with the low temperature and the low pressure absorbs ambient heat and vaporizes while flowing through the cooling water circulation space 41a. Thereby, the inlet pipe 21 and the cooling water circulation pipe 41 are cooled.

The gas-liquid two-phase fluid flows through the inlet pipe 21. When the gas-liquid two-phase fluid contacts the inner circumferential surface 21a of the inlet pipe 21, the heat of the gas-liquid two-phase fluid is transferred to the inlet pipe 21 and absorbed so that the gas-liquid two-phase fluid is cooled. Accordingly, the temperature of the gas-liquid two-phase fluid is decreased to facilitate the liquid contained in the gas-liquid two-phase fluid to be droplets. In addition, by facilitating the formation of the droplets, the weight of each droplet becomes heavier so that the droplets (liquid) can be guided to the inner circumferential surface 21a of the inlet pipe 21 even if the centrifugal force caused by the swirling flow is relatively weak. Consequently, the liquid separation rate from the gas-liquid two-phase fluid can be improved.

(Acceleration of Liquid Evaporation) In the gas-liquid separator 20 according to the first embodiment, the gas separated from the liquid flows into the inner pipe 22 while keeping swirling and then flows to the turbocharger 5 (not shown). However, if the liquid which is not separated from the gas exists, such non-separated liquid may flow into the inner pipe 22 with the gas.

In the case where the liquid flown into the inner pipe 22 with the gas has turned to droplets having a certain weight, the liquid flowing downstream may collide with rotor blades of the compressor 5a of the turbocharger 5 to give an impact thereto.

In the gas-liquid separator 20 according to the first embodiment, the inner circumferential surface 22d of the inner pipe 22 includes a plurality of the circular grooves 22e (two in this embodiment) each including the first step surface 51, the second step surface 52, and the bottom surface 53.

The liquid flown into the inner pipe 22 is guided to the inner circumferential surface 22d by the swirling gas flowing through the inner pipe 22 and the liquid coheres to be droplets. The liquid in the form of the droplets flows along the inner circumferential surface 22d and then flows into the circular grooves 22e.

Figure 7:
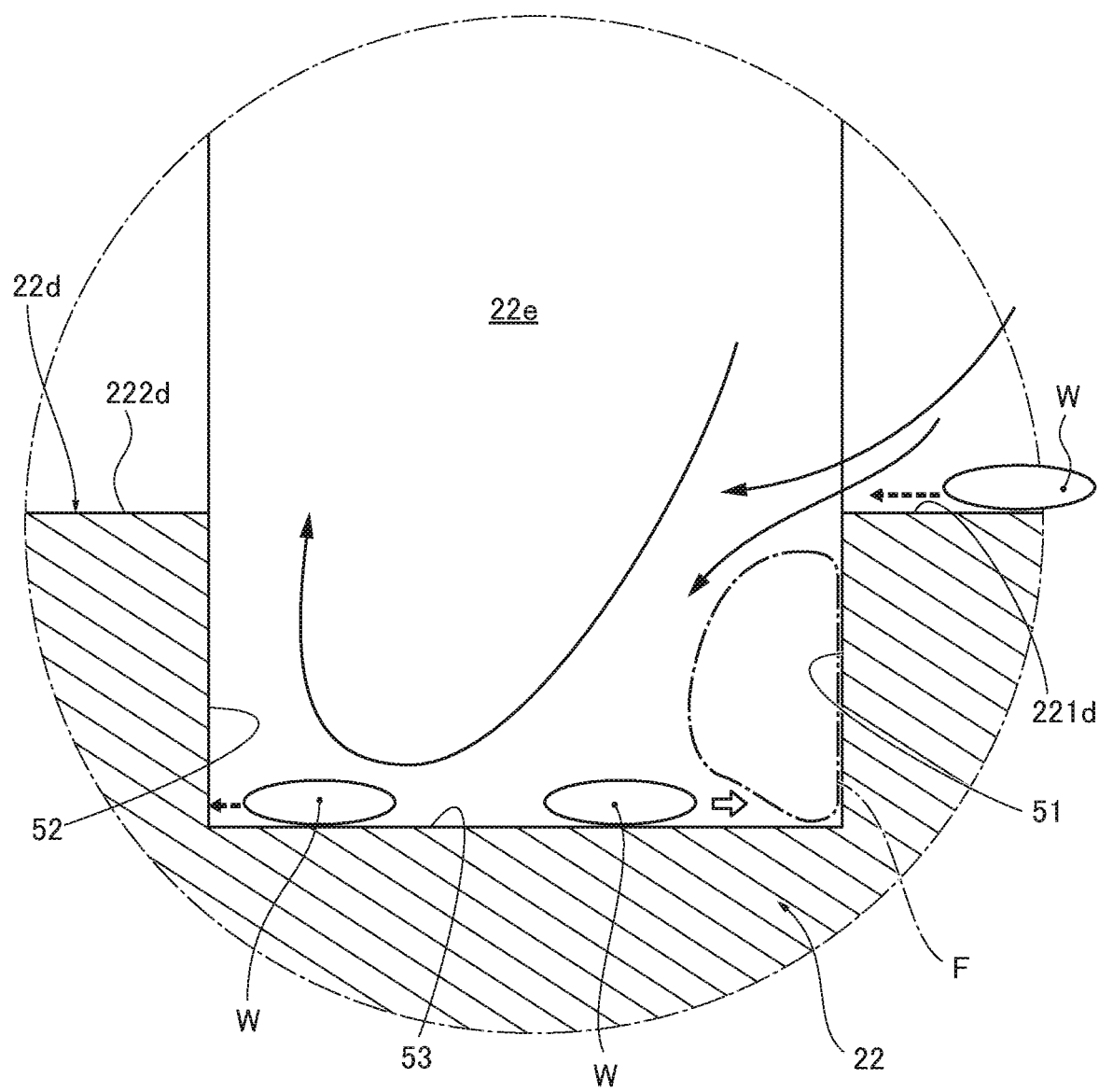
FIG. 7 is an enlarged view of a portion B shown in FIG. 5.

At this time, as shown in FIG. 7, the gas flowing into the circular groove 22e generates a turbulent flow within the circular groove 22e, which generates a negative pressure region F along the first step surface 51 located upstream in the flow direction of the gas-liquid two-phase fluid. Accordingly, the droplets W flown into the circular grooves 22e together with the gas are pulled by the negative pressure toward the first step surface 51. Thereby, the droplets W remain within the circular groove 22e, specifically in the vicinity of the first step surface 51.

The bottom surface 53 of the circular groove 22e extends in the circumferential direction of the inner pipe 22. Accordingly, the swirling gas circumferentially flows along the bottom surface 53 within the circular groove 22e. In addition, the droplets W remained within the circular groove 22e also flows along the bottom surface 53 within the circular groove 22e together with the swirling gas. In other words, the gas and the droplets W swirl along the bottom surface 53. Then, the droplets W keep swirling along the bottom surface 53 and then evaporate.

The droplets W flown into the inner pipe 22 swirl within the circular groove 22e while pulled to the first step surface 51 and then evaporate. Thereby, it is possible to prevent the droplets W from flowing downward through the inner pipe 22 together with the gas.

As explained above, the liquid (the droplets W) separated from the gas swirls within the circular groove 22e while pulled to the first step surface 51 and then evaporates. Thereby, it is possible to prevent the droplets W from flowing toward the fluid exiting side beyond the circular groove 22e.

Particularly, in the first embodiment, the inner circumferential surface 22d of the inner pipe 22 includes a plurality of the circular grooves 22e (two in this embodiment). Accordingly, there is a plurality of chances (twice in this embodiment) to keep the droplets W remained within the circular grooves 22e to evaporate the droplets W. Consequently, more liquid can be vaporized and accordingly the vaporization rate of the droplets can be improved.

Further, in the gas-liquid separator 20 according to the first embodiment, the electrical heating sheet 22h surrounds the portion of the outer circumferential surface 22f of the inner pipe 22 extending from the inlet pipe 21 as shown in FIG. 5. Therefore, the electrical heating sheet 22h can heat the outer circumferential surface 22f of the inner pipe 22 when turned on to generate heat.

Thereby, it is possible to increase the temperature in the portion of the inner pipe 22 extending from the inlet pipe 21 and to facilitate the liquid flown into the inner pipe 22 together with the gas to evaporate. Accordingly, it is possible to evaporate and vaporize the droplets flown into the inner pipe 22 and to prevent the liquid in the form of the droplets from flowing downstream together with the gas. Consequently, the vaporization rate of the droplets can be improved.

In the first embodiment, the circular groove 22e including the first step surface 51 is formed on the portion of the inner circumferential surface 22d of the inner pipe 22 extending from the inlet pipe 21 and surrounded by the electrical heating sheet 22h. Therefore, the portion of the outer circumferential surface 22f including the circular groove 22e can be heated by the electrical heating sheet 22h.

Therefore, it is possible to facilitate the evaporation of the droplets in the vicinity of the first step surface 51 of the circular groove 22e and to effectively evaporate the droplets flown into the inner pipe 22.

(Maintain of Droplets by Second Step Surface) In the first embodiment, each of the circular grooves 22e formed on the inner pipe 22 includes the second step surface 52. The second step surface 52 is provided closer to the fluid exiting side than the first step surface 51. The second step surface 52 decreases the inner diameter of the inner pipe 22 in a step-wise manner toward the fluid exiting side.

Therefore, as shown in FIG. 7, even if the droplets W flown into the circular groove 22e move away from the first step surface 51 toward the fluid exiting side by the swirling flow, the second step surface 52 can prevent the movement of the droplets W and keep the droplets remained within the circular groove 22e. In other words, the second step surface 52 can prevent the droplets W from flowing downstream of the circular groove 22e. Consequently, the droplets W is kept remained within the circular groove 22e to be evaporated and accordingly the liquid in the form of the droplets W can be suppressed from flowing downward.

Although the gas-liquid separator of the present disclosure has been described with reference to the first embodiment, the specific configuration of the gas-liquid separator is not limited to the embodiment, and modifications of the configuration and/or additions to the above configuration may be made without departing from the gist of the inventions recited in the claims.

Figure 8:
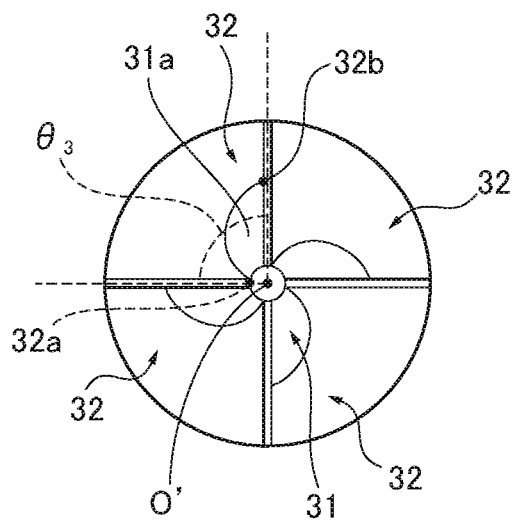
FIG. 8 is a front view illustrating a vane supporting portion according to a modification of the first embodiment.

In the first embodiment, the number of the stator vanes 32 provided in the swirling flow generating member 30 is four. However, the number of the stator vanes 32 is not limited to four and the swirling flow generating member 30 may have one or more stator vanes 32. The surrounding angle $\theta_3$ of each stator vane 32 relative to the vane supporting portion 31 may be set as desired. For example, the surrounding angle $\theta_3$ may be set to an angle to leave no clearance between the stator vanes 32 in the circumferential direction of the vane supporting portion 31 when the swirling flow generating member 30 is seen in the axial direction thereof as shown in FIG. 8.

Figure 9A:
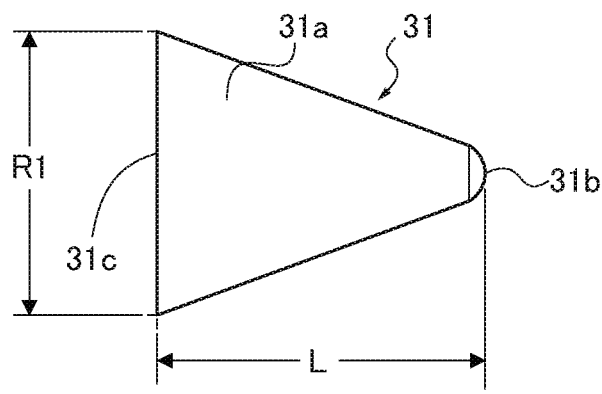
FIG. 9A is a side view illustrating a vane supporting portion according to a first modified example.
Figure 9B:
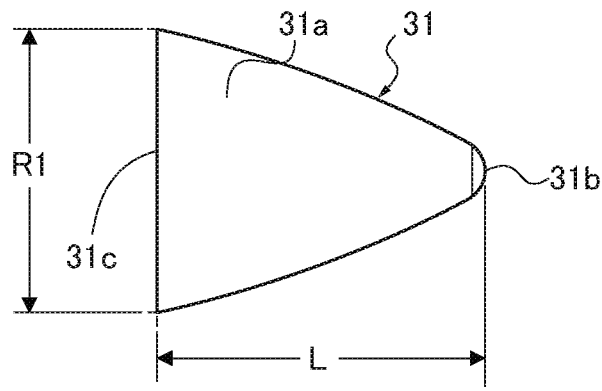
FIG. 9B is a side view illustrating a vane supporting portion according to a second modified example.
Figure 9C:
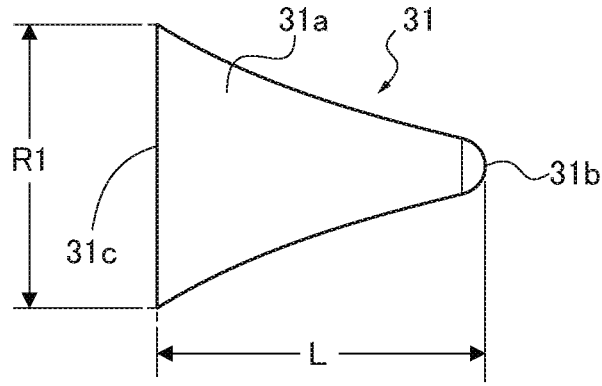
FIG. 9C is a side view illustrating a vane supporting portion according to a third modified example.

In addition, the axial dimension L of the outer circumferential surface 31a of the vane supporting portion 31, the maximum outer diameter dimension R1, the curvature of the leading end 31b, and the like may also be set as desired. Also, the shape of the outer circumferential surface 31a is not limited to the one in the first embodiment. For example, the outer circumferential surface 31a may be a flat surface (see FIG. 9A), a convex curved surface (see FIG. 9B), a concave curved surface (see FIG. 9C), or the like. Moreover, the cross-sectional shape of the stator vane 32 may be set as desired. For example, the cross-sectional shape of the stator vane 32 may be rectangular, teardrop-shaped, or the like.

Further, in the first embodiment, the inlet pipe 21 includes the first drain port 21c and the second drain port 21d. The inlet pipe 21 is not limited to the one in the first embodiment. For example, in a gas-liquid separator 20A shown in FIG. 10, an end portion 21f of the inlet pipe 21 in the fluid entering side may be inserted into an end portion 50a of a fluid inflow pipe 50 in the fluid exiting side whose inner diameter is larger than the outer diameter of the inlet pipe 21.

In this example, the inlet pipe 21 includes in the end portion 21f an opening 21g which opens along the axis line O.

The end portion 50a of the fluid inflow pipe 50 includes an enlarged inner diameter portion 50b and a drain port 50c. The enlarged inner diameter portion 50b is an area whose inner diameter is larger than that of a general or primary portion of the fluid inflow pipe 50. The drain port 50c is an opening which is formed on the circumferential surface of the enlarged inner diameter portion 50b and opens in the radial direction of the fluid inflow pipe 50 and downward in the direction of gravity. In addition, a tapered surface 50d is formed in a boundary between the enlarged inner diameter portion 50b and the primary portion of the fluid inflow pipe 50. The tapered surface 50d gradually increases the inner diameter of the fluid inflow pipe 50. Further, the second drain pipe 24 is attached to the drain port 50c which is in communication with the reservoir tank 25. The end portion 21f of the inlet pipe 21 is inserted into the enlarged inner diameter portion 50b and extends above the drain port 50c.

Figure 10:
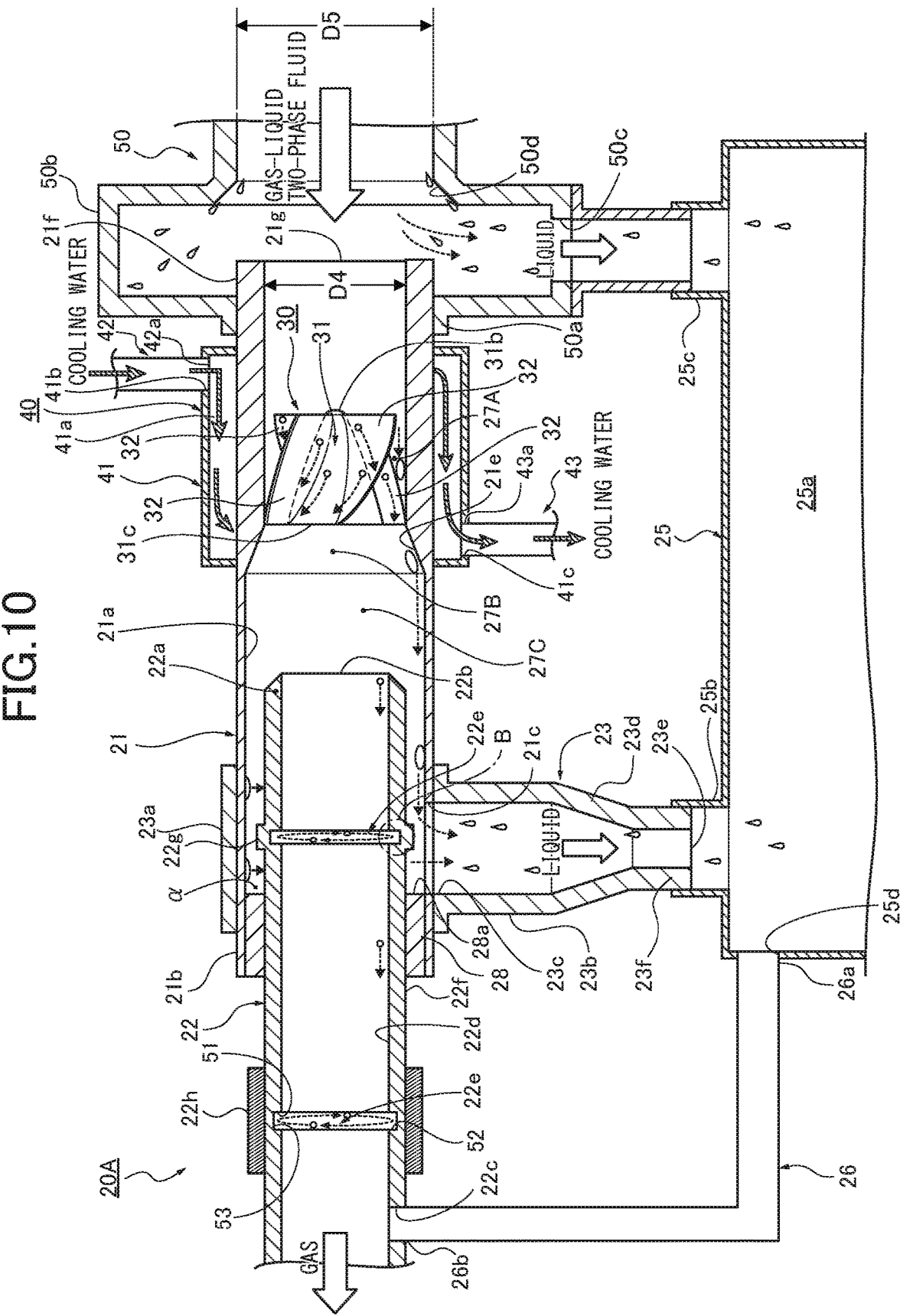
FIG. 10 is a cross-sectional view illustrating a gas-liquid separate according to a modification of the first embodiment.

As shown in FIG. 10, the gas-liquid two-phase fluid enters the gas-liquid separator 20A from the fluid inflow pipe 50 and turns to the swirling flow in the inlet pipe 21. At this time, the liquid contained in the gas-liquid two-phase fluid which can fall down in the direction of gravity by its own weight flows out of the fluid inflow pipe 50 through the drain port 50c by its own weight before entering the inlet pipe 21. Consequently, the liquid contained in the gas-liquid two-phase fluid swirling within the inlet pipe 21 can be reduced and accordingly the liquid separation rate can be increased.

Further, in the gas-liquid separator 20A, an inner diameter dimension D5 of the fluid inflow pipe 50 is set to be larger than the inner diameter dimension D4 of the inlet pipe 21. Accordingly, the flow rate of the gas-liquid two-phase fluid is higher in the inlet pipe 21 rather than that in the fluid inflow pipe 50. Consequently, the swirling force of the gas-liquid two-phase fluid within the inlet pipe 21 can be increased.

In addition, the tapered surface 50d is formed in the boundary between the enlarged inner diameter portion 50b and the primary portion of the fluid inflow pipe 50. Thereby, the droplets flowing along the inner circumferential surface of the fluid inflow pipe 50 flow outwardly from the center of the pipe. Consequently, the droplets are suppressed from entering the inlet pipe 21 which is inserted into the fluid inflow pipe 50.

Moreover, in the first embodiment, the tapered surface 21e is formed on the inner circumferential surface 21a of the inlet pipe 21. However, the tapered surface 21e may not be formed. Even in this case, the liquid separated from the gas-liquid two-phase fluid can flow into the drain port 21c by the swirling flow.

Also, in the first embodiment, the first drain pipe 23, which is connected to the first drain port 21c, and the second drain pipe 24, which is connected to the second drain port 21d (the upstream drain port), are connected to the reservoir tank 25. However, it is not necessary to dispose the first drain pipe 23, the second drain pipe 24, and the reservoir tank 25. Specifically, the liquid from the inlet pipe 21 may be directly discharged without retained in the reservoir tank. Further, the number of the reservoir tank is not limited to one and may be provided for each of the drain pipes. Alternatively, one of the drain pipes may be connected to the reservoir tank. In other words, the reservoir tank may be provided as desired. In addition, it is not necessary to dispose the second drain port 21d and the bypass pipe 26.

Further, in the first embodiment, the spacer 28 is separately formed from the inlet pipe 21 and the inner pipe 22. However, the spacer 28 may be integrally formed with the inner circumferential surface 21a of the inlet pipe 21 or the outer circumferential surface 22f of the inner pipe 22.

In the gas-liquid separator 20 according to the first embodiment, the pipe cooling structure 40 uses the refrigerant of the vehicle air conditioner as the cooling water but may use an engine coolant (LLC: Long Life Coolant), for example. In addition, the flow direction of the cooling water may be opposite to the direction in the first embodiment.

Moreover, in the gas-liquid separator 20 according to the first embodiment, the circular grooves 22e are formed on the inner circumferential surface 22d of the inner pipe 22, and each of the circular grooves 22e includes the first step surface 51 and the second step surface 52. However, the inner circumferential surface 22d of the inner pipe 22 may include only the first step surface 51 which increases the inner diameter of the inner pipe 22 in a stepwise manner toward the fluid exiting side. In this case, the negative pressure region can also be generated along the first step surface 51 so that the liquid in the form of the droplets can remain in the vicinity of the first step surface 51 and circumferentially swirl to evaporate.

Further, in the case that only the first step surface is provided, a plurality of first step surfaces may be provided along the flow direction of the gas-liquid two-phase fluid. Specifically, the inner diameter of the inner pipe 22 may intermittently increase in a stepwise manner at a plurality of locations. In this case, it is possible to evaporate the droplets a plurality of times and to improve the vaporization rate of the droplets since the liquid may remain in the vicinity of the first step surfaces at the plurality of locations to evaporate.

Moreover, in the first embodiment, the angle $\theta_1$ is defined by the first step surface 51 formed in the inner pipe 22 and the inner circumferential surface 221d of the inner pipe located in the fluid entering side of the first step surface 51, and the angle $\theta_1$ is set to 90 degrees. However, the angle $\theta_1$ may be set to any angle as long as generating the negative pressure region F along the first step surface 51. Specifically, the angle $\theta_1$ may be an acute angle set to be equal to or lower than 90 degrees.

Further, in the gas-liquid separator 20 according to the first embodiment, the angle $\theta_2$ is defined by the second step surface 52 formed in the inner pipe 22 and the inner circumferential surface 222d of the inner pipe located in the fluid exiting side of the second step surface 52, and the angle $\theta_2$ is set to 90 degrees. However, the angle $\theta_2$ may be set to any angle as long as the angle can prevent the droplets in the circular groove 22e from flowing downstream along the second step surface 52. Specifically, the angle $\theta_2$ may be an acute angle set to be equal to or lower than 90 degrees.

Moreover, in the first embodiment, the axial position of one of the circular grooves 22e formed on the inner circumferential surface 22d of the inner pipe 22 is coincident with the axial position of the protrusion 22g formed on the outer circumferential surface 22f of the inner pipe 22. Accordingly, it is possible to simultaneously form the circular groove 22e and the protrusion 22g by protruding a portion of the inner pipe 22 in which the inner circumferential surface 22d is recessed. Consequently, it is possible to prevent the reduction of the wall thickness of the inner pipe 22 due to the formation of the circular groove 22e. However, the axial positions of the circular grooves 22e and the protrusion 22g are not limited to the above, and the axial position of the circular grooves 22e may deviate from the axial position of the protrusion 22g along the axis line O.

Further, in the first embodiment, the flexible electrical heating sheet 22h is used as the heating structure for heating the outer circumferential surface 22f of the inner pipe 22, but the heating structure is not limited to the above. For example, the inner pipe may be formed in a double pipe structure having two pipe walls to circulate high-temperature exhaust gas between the two pipe walls to heat the inner pipe as long as the portion of the inner pipe 22 extending from the inlet pipe 21 can be heated. In other words, the circulation structure for the exhaust gas may be used as a heating structure.

In addition, the gas-liquid separator 20 according to the first embodiment is disposed at the location downstream of the low-pressure EGR valve 14 and upstream of the compressor 5a of the turbocharger 5 (i.e. at the location surrounded with a dashed line X in FIG. 1) in the exhaust gas recirculation system S. However, the location of the gas-liquid separator 20 is not limited to the above. The gas-liquid separator 20 may be disposed at a location where condensed water is produced in the exhaust gas recirculation system S. Accordingly, the gas-liquid separator 20 may be disposed at a location downstream of the intercooler 6 and upstream of the cylinder intake ports of the internal combustion engine 1 (i.e. at the location surrounded with a dashed line Y in FIG. 1).

Further, in the first embodiment, the gas-liquid separator 20 is horizontally installed so that the flow direction of the gas-liquid two-phase fluid is horizontal with respect to the direction of gravity. However, the installation direction of the gas-liquid separator 20 in the present disclosure is not limited to the one in the first embodiment. The installation direction of the gas-liquid separator 20 may be properly selected in accordance with factors such as the layout in the exhaust gas recirculation system S.

Moreover, in the first embodiment, the internal combustion engine 1 is the diesel engine mounted in the vehicle. However, the internal combustion engine 1 is not limited to the diesel engine and may be a gasoline engine.

Furthermore, in the first embodiment, the gas-liquid separator 20 is applied to the exhaust gas recirculation system S of the internal combustion engine 1. However, the gas-liquid separator is not limited to the above and may be applied to a refrigeration cycle device, for example, to separate a gaseous refrigerant and a liquid refrigerant. In other words, the gas-liquid separator of the present disclosure may be applied to devices which separate the liquid and the gas from the gas-liquid two-phase fluid.

In addition, the positions of the connection, the shape and the diameter of each pipe (the inlet pipe, etc.), and the like are not limited to ones in the first embodiment and may be selected as desired.

The invention claimed is:
1. A gas-liquid separator for separating a liquid and a gas from a gas-liquid two-phase fluid, the gas-liquid separator comprising:
   a swirling flow generating member configured to swirl the gas-liquid two-phase fluid;

an inlet pipe in which the swirling flow generating member is disposed; and an inner pipe, an end of which being inserted into an end of the inlet pipe and formed with an opening, wherein the inlet pipe comprises:

an inner circumferential surface to which the separated liquid is guided; and a drain port through which the liquid exits the inlet pipe, the drain port located in a fluid exiting side of the gas-liquid two-phase fluid from the swirling flow generating member, wherein the swirling flow generating member extends along an axis line of the inlet pipe, and wherein the swirling flow generating member comprises:

a vane supporting portion having a conical shape whose diameter gradually increases from a fluid entering side to the fluid exiting side of the gas-liquid two-phase fluid; and at least four stator vanes provided on an outer circumferential surface of the vane supporting portion, the stator vanes surrounding the outer circumferential surface and being arranged at regular intervals in the circumferential direction of the vane supporting portion, wherein each stator vane only partially surrounds the outer circumferential surface of the vane supporting portion, wherein a straight line extending through a first end position of each of the stator vanes at a leading end of the vane supporting portion and a second end position of each of the stator vanes at a tailing end of the vane supporting portion inclines relative to an axis line of the vane supporting portion, wherein a surrounding angle of each of the stator vanes with respect to the vane supporting portion is set to an angle to leave no clearance between the stator vanes in the circumferential direction of the vane supporting portion when the swirling flow generating member is seen in an axial direction thereof, wherein for each stator vane, the surrounding angle is an angle defined by (i) a first straight line radially extending from the axis line of the vane supporting portion along the first end position of the stator vane at the leading end of the vane supporting portion and (ii) a second straight line radially extending from the axis line of the vane supporting portion along the second end position of the stator vane at the tailing end of the vane supporting portion, wherein the inner circumferential surface of the inlet pipe comprises a tapered surface that gradually increases an inner diameter of the inlet pipe in the flow direction of the gas-liquid two-phase fluid, wherein an area of the inlet pipe where the tapered surface is provided comprises an end in the fluid entering side of the gas-liquid two-phase fluid, and wherein the tailing end of the vane supporting portion and a tailing end of each of the stator vanes are located in a same plane which is adjacent to and upstream of the end of the area of the inlet pipe with respect to the flow direction of the gas-liquid two-phase fluid.

2. The gas-liquid separator according to claim 1, further comprises:

a drain pipe connected to the drain port of the inlet pipe;

a reservoir tank connected to a tip portion of the drain pipe; and a bypass pipe connected to the inner pipe and the reservoir tank.

3. The gas-liquid separator according to claim 1, wherein the inlet pipe comprises an upstream drain port through which the liquid exits, and the upstream drain port is provided in the fluid entering side of the gas-liquid two-phase fluid from the swirling flow generating member.

4. The gas-liquid separator according to claim 1, wherein the inlet pipe comprises a pipe cooling structure configured to cool at least a portion of the inlet pipe where the swirling flow generating member is disposed.

5. The gas-liquid separator according to claim 1, wherein the inner pipe comprises a first step surface on an inner circumferential surface thereof, and wherein the first step surface is configured to increase an inner diameter of the inner pipe in a step-wise manner toward the fluid exiting side of the gas-liquid two-phase fluid.

6. The gas-liquid separator according to claim 5, wherein the inner pipe further comprises a second step surface on the inner circumferential surface in the fluid exiting side of the gas-liquid two-phase fluid from the first step surface, and wherein the second step surface is configured to decrease the inner diameter of the inner pipe in a step-wise manner toward the fluid exiting side of the gas-liquid two-phase fluid.

7. The gas-liquid separator according to claim 1, wherein the inner pipe comprises a protrusion on an outer circumferential surface of a portion of the inner pipe inserted into the inlet pipe, and the protrusion extends in a circumferential direction of the inner pipe.

8. The gas-liquid separator according to claim 1, wherein the inner pipe comprises a heating structure configured to heat a portion of the inner pipe extending from the inlet pipe.

9. The gas-liquid separator according to claim 1, wherein the surrounding angle of each of the stator vanes is 90 degrees.

* * * * *